Figure 1:
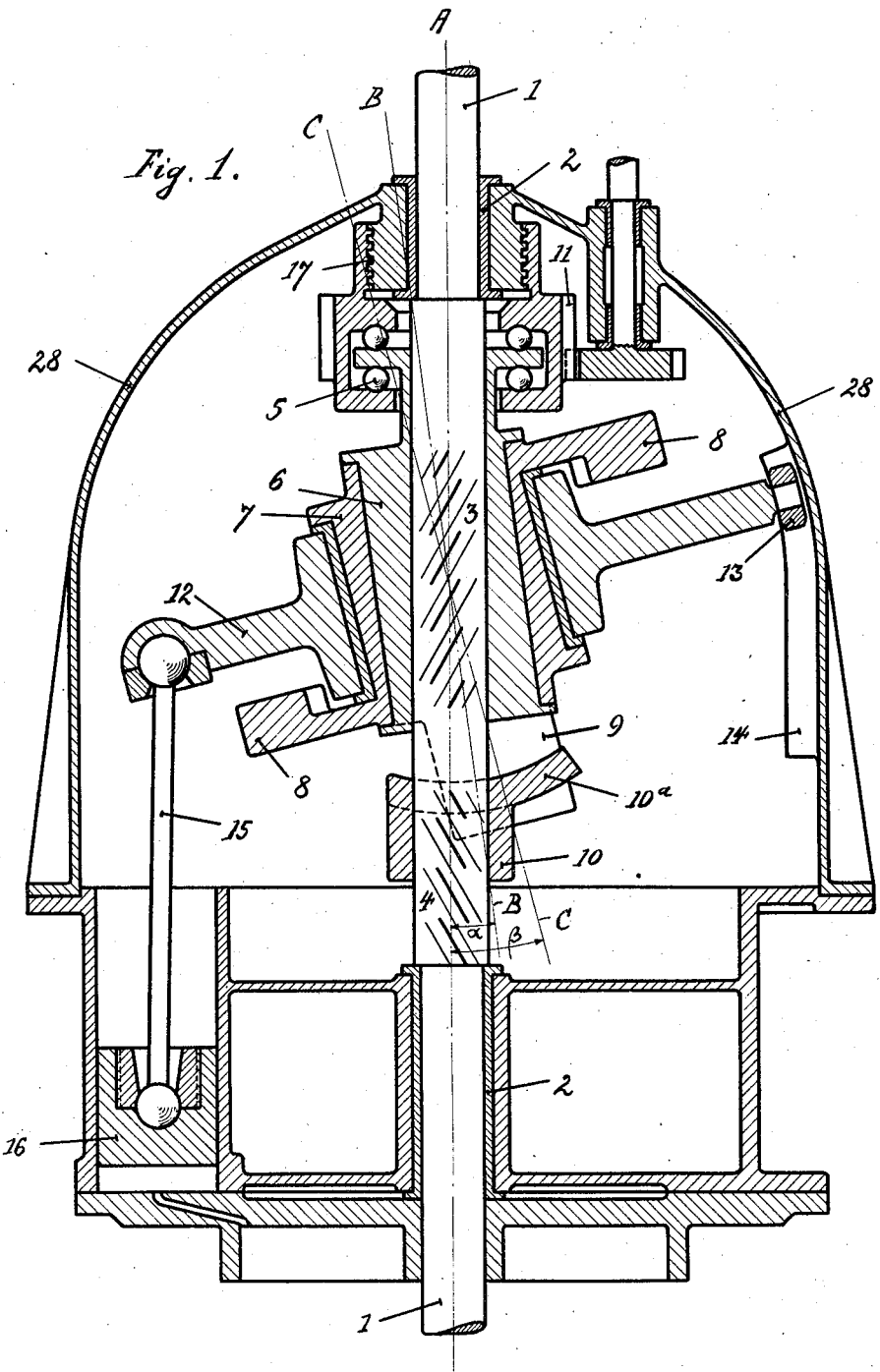

Aug. 18, 1931.  L. LE BRET  1,819,715
ECCENTRIC BALANCE DRIVING GEAR
Filed Aug. 31, 1927   2 Sheets-Sheet 2
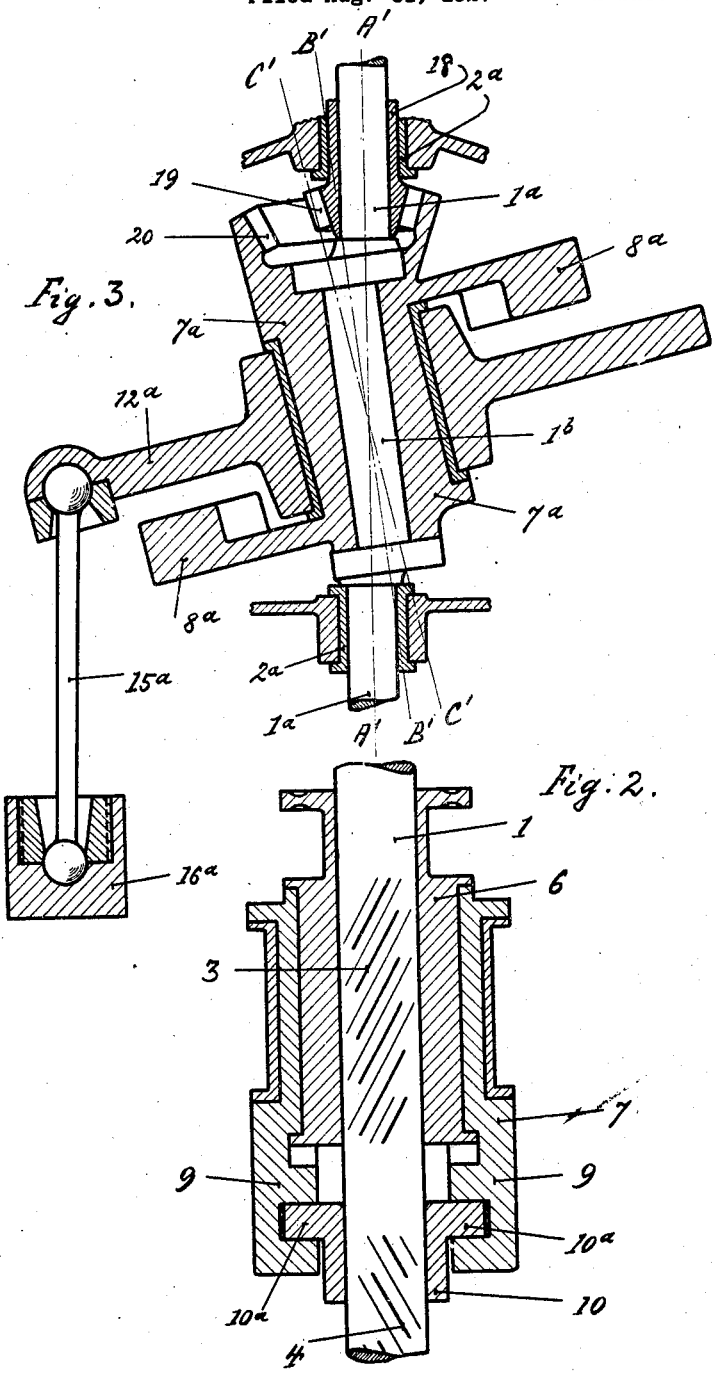

Patented Aug. 18, 1931

1,819,715

UNITED STATES PATENT OFFICE

LUDWIG LE BRET, OF CHARLOTTENBURG, GERMANY

ECCENTRIC BALANCE DRIVING-GEAR

Application filed August 31, 1927, Serial No. 216,732, and in Germany November, 1923.

This invention relates to an eccentric balance driving-gear of adjustable stroke, for which I have filed an application in Germany, in November, 1923, which from known gears of similar type is distinguished by its individual parts being essentially simplified and limited to a minimum number while links are omitted as much as possible, whereby a great safety of working and a high efficiency are attained. To this end, according to the invention, the balance arm of the gear is mounted on two obliquely eccentric members located within and rotatable with reference to one another, of which the outer one carries the balance arm while the inner one is mounted on the balance arm shaft. For an increase of the adjustability, the inner obliquely eccentric member can, for instance, be axially displaceable by means of screw-threads on the balance arm shaft, the outer obliquely eccentric member being in engagement with a guiding nut that is also axially displaceable on the balance arm shaft by means of screw-threads thereon that are oppositely directed to the other screw-threads mentioned. When driving pistons or plungers by means of the improved eccentric balance driving-gear, the arrangement described allows, simultaneously with an adjustment of the stroke, a change of the ratio of rebound. Thereby, for instance, with internal combustion engines the capacity within highest limits of speed can be kept constant, while with pumps and compressors of greatly varying quantities delivered, the speed of the driving engine remains uniform.

The accompanying drawings illustrate by way of example two preferred constructional forms of the improved eccentric balance driving-gear: Fig. 1 is a vertical central section through one form thereof, and Fig. 2 is a similar section, but at right angles to that shown in Fig. 1, through a detail thereof, while Fig. 3 is a similar section through the other form.

Referring to Figs. 1 and 2:—The shaft 1 is mounted in bearings 2 and provided with two oppositely directed screw-threaded parts 3 and 4. Over the screw-threads 3 an internally screw-threaded obliquely eccentric member 6 is mounted and held by means of a support 5, the longitudinal axis B—B of said member 6 being inclined with reference to that, A—A, of the shaft 1 by the angle $\alpha$. Said member 6 carries another obliquely eccentric member 7, that is rotatable thereon and fitted with counterweights 8, the longitudinal axis C—C of said member 7 being inclined with reference to that, A—A, of the shaft 1 by the angle $\beta$, that is double as large as the angle $\alpha$. Said member 7 has two projections 9 thereon, that are provided with a circularly arched recess in which engages a guiding nut 10 with corresponding arms 10$a$ thereon. On said member 7 the balance arm 12 is rotatably mounted. Said balance arm 12 carries at one end a roller 13 or the like, that is in positive engagement with a stationary guiding race 14 so as to prevent said balance arm 12 from rotation about the shaft 1. The other end of said balance arm 12 is in pivotal connection by means of a rod 15 with a working plunger or piston 16. The support 5 carrying the member 6 is mounted on a stationary screw-threaded bearing 17 and adjustable thereon by means of a manually or mechanically operated toothed gearing 11. The whole arrangement is preferably enclosed by a casing 28.

The operation of the improved eccentric balance driving-gear is as follows:—

With rotating shaft 1, the longitudinal axis C—C of the obliquely eccentric member 7 describes a cone, whereby the balance arm 12 is so moved that it drives the working plunger or piston 16 by means of the connection-rod 15.

The adjustment of the driving-gear takes place from the toothed gearing 11, by an operation of which the obliquely eccentric member 6 is displaced on the screw-threads 3 while the obliquely eccentric member 7 is displaced in opposite direction by means of the guiding nut 10 on the screw-threads 4. Thereby, on the one hand, a change of the angle $\beta$ and thus of the stroke of the balance arm 12 and on the other hand due to the axial displacement of the member 7 at the same time a change or under certain circumstances a maintenance of the ratio of rebound, depending on the pitch of the screw-threads, is attained.

In the driving-gear shown in Fig. 3, the obliquely eccentric member 7a with its counterweights 8a thereon is mounted on an oblique bend 1b of the shaft 1a mounted in bearings 2a, a turning of the member 7a on the bent shaft part 1b resulting in a change of the stroke of the balance arm 12a connected by rod 15a with the working plunger or piston 16a. Said turning is effected by means of a sleeve 18 having a toothed rim 19 thereon in gear with an internal toothing 20 on the member 7.

In this example, the oblique bend 1b forms the inner obliquely eccentric member of the driving-gear.

As the axis C'—C' of the member 7a lies at a different inclination angle to the axis A'—A' of the shaft 1a than the axis B'—B' of the bent shaft part 1b, a turning of the member 7a on the latter results in different inclinations of the balance arm 12a.

What I claim, is:—

1. In an eccentric balance driving-gear, the combination with an operative positively guided balance arm, and a shaft for the latter, of two obliquely eccentric members arranged within and rotatable and thereby adjustable with reference to one another, the outer member carrying said arm and the inner one being arranged on said shaft, two oppositely directed screw-threaded parts on said shaft, one of said parts serving for the reception of said inner obliquely eccentric member thereon, recessed projections on said outer obliquely eccentric member, and a guiding nut in engagement with said recessed projections and screwed over the other screw-threaded shaft part.

2. In an eccentric balance driving gear an interchangeable shaft having two oppositely directed screw threaded parts, an inner obliquely eccentric member on one of said threaded parts of said shaft, an outer obliquely eccentric member on said inner member, recessed projections on said outer obliquely eccentric member, a guiding nut in engagement with said recessed projections and screwed over the other screw-threaded shaft part, a balancing arm on said outer member, and means for adjusting said members on said shaft so that the stroke of said balancing arm is altered and with the same the oscillation center of said balancing arm whereby the balancing arm can be adjusted to the compression conditions of the machine.

3. An eccentric balance as specified in claim 2, comprising in combination with said shaft and said inner obliquely eccentric member screwed on said shaft, a casing enclosing the mechanism, and a support on said shaft carrying said inner member for directly transmitting any axial forces directly from said inner member on said casing in relieving said shaft.

4. An eccentric balance as specified in claim 2, comprising in combination with said shaft said inner obliquely eccentric member screwed on said shaft, a stationary screw-threaded bearing on said shaft, and a support on said shaft mounted on said stationary bearing and carrying said inner member, for adjusting said inner member on said shaft.

5. In an eccentric balance driving-gear, in combination with an operative positively guided balance arm and a shaft for the latter, an inner obliquely eccentric member shiftably mounted on said shaft, an outer obliquely eccentric member shiftably mounted on said inner obliquely eccentric member and carrying said balance arm, and means for mutually shifting said oblique eccentric members in opposite directions relative to said shaft for altering the angle of inclination of said balance arm and thereby the stroke, said angle of inclination remaining constant during the driving.

In testimony whereof I have hereunto set my hand:

LUDWIG LE BRET.